(12) United States Patent (10) Patent No.: US 11,323,389 B2
Krebs et al. (45) Date of Patent: May 3, 2022

(54) LOGIC SCALING SETS FOR CLOUD-LIKE ELASTICITY OF LEGACY ENTERPRISE APPLICATIONS

(71) Applicant: SAP SE, Walldorf (DE)

(72) Inventors: Rouven Krebs, Römerberg (DE); Steffen Koenig, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/912,870

(22) Filed: Jun. 26, 2020

(65) Prior Publication Data

US 2021/0409347 A1 Dec. 30, 2021

(51) Int. Cl.
*H04L 47/70* (2022.01)
*G06F 9/355* (2018.01)
*H04L 47/78* (2022.01)
*H04L 47/762* (2022.01)

(52) U.S. Cl.
CPC .......... *H04L 47/828* (2013.01); *G06F 9/3555* (2013.01); *H04L 47/762* (2013.01); *H04L 47/788* (2013.01); *H04L 47/827* (2013.01)

(58) Field of Classification Search
CPC ... H04L 47/828; H04L 47/762; H04L 47/788; H04L 47/827; H06F 9/3555; H06F 9/455; H06F 9/07
See application file for complete search history.

(56) References Cited

U.S. PATENT DOCUMENTS

| | | | |
|---|---|---|---|
| 8,644,755 B2 | 2/2014 | Krebs et al. | |
| 9,294,456 B1 * | 3/2016 | Timmermans | ........ H04L 63/083 |
| 9,584,588 B2 | 2/2017 | Mehta et al. | |
| 9,760,847 B2 | 9/2017 | Krebs et al. | |
| 10,409,642 B1 * | 9/2019 | Tang | ..................... G06F 9/5061 |
| 10,637,888 B2 | 4/2020 | Krebs | |
| 10,637,952 B1 | 4/2020 | Koenig et al. | |
| 2010/0070443 A1 | 3/2010 | Krebs | |
| 2014/0359113 A1 | 12/2014 | Krebs et al. | |
| 2016/0328258 A1 * | 11/2016 | Iwashina | ............... G06F 9/5072 |
| 2016/0335111 A1 * | 11/2016 | Bruun | ................. G06F 9/45558 |
| 2018/0359162 A1 * | 12/2018 | Savov | ................. H04L 41/5051 |
| 2019/0042736 A1 | 2/2019 | Krebs et al. | |
| 2019/0042737 A1 | 2/2019 | Krebs | |
| 2019/0050376 A1 | 2/2019 | Krebs et al. | |
| 2019/0052675 A1 | 2/2019 | Krebs | |

(Continued)

OTHER PUBLICATIONS

U.S. Appl. No. 16/210,060, Krebs et al., filed Dec. 5, 2018.

(Continued)

*Primary Examiner* — Abdelnabi O Musa

(74) *Attorney, Agent, or Firm* — Fish & Richardson P.C.

(57) ABSTRACT

Methods, systems, and computer-readable storage media for determining, by an instance manager and from a pattern associated with a system executing within a landscape, that a status of the system is to change to scaled-in, the pattern being absent any reference to instances of systems executed within landscapes, in response, identifying, by the instance manager and from a logic scaling set that is associated with the system, one or more instances of the system that are able to be scaled-in, selecting, by the instance manager, at least one instance of the one or more instances, and executing, by the instance manager, scaling of the system based on the at least one instance.

20 Claims, 5 Drawing Sheets

(56) References Cited

U.S. PATENT DOCUMENTS

2019/0123963 A1\* 4/2019 Tang .................. H04W 48/18
2019/0384630 A1   12/2019 Hoke et al.
2020/0285652 A1\* 9/2020 Wang ................ H04L 61/2007
2021/0105340 A1\* 4/2021 Grozdanov ........... G06T 19/006

OTHER PUBLICATIONS

U.S. Appl. No. 16/691,829, Krebs et al., filed Nov. 22, 2019.
Wikipedia.org[Online], "Elasticity (cloud computing)" available on or before Aug. 28, 2013, via Internet Archive: Wayback Machine URL <https://web.archive.org/web/20130828114036/http://en.wikipedia.org/wiki/Elasticity_(cloud_computing)>, retrieved on Jun. 22, 2020, URL<https://en.wikipedia.org/wiki/Elasticity_(cloud_computing>, 2 pages.

\* cited by examiner

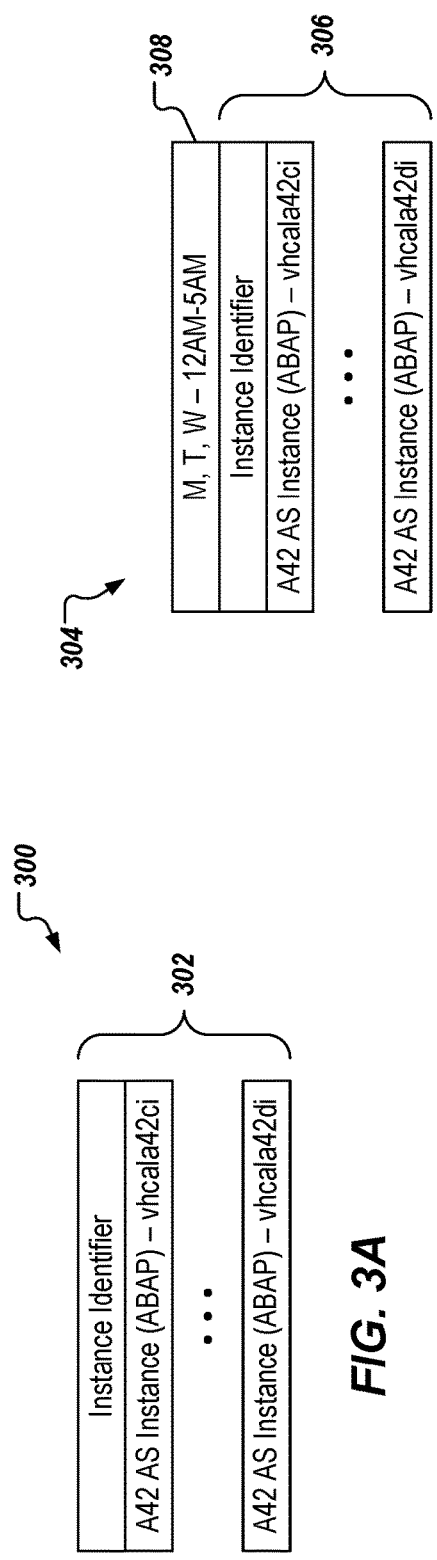
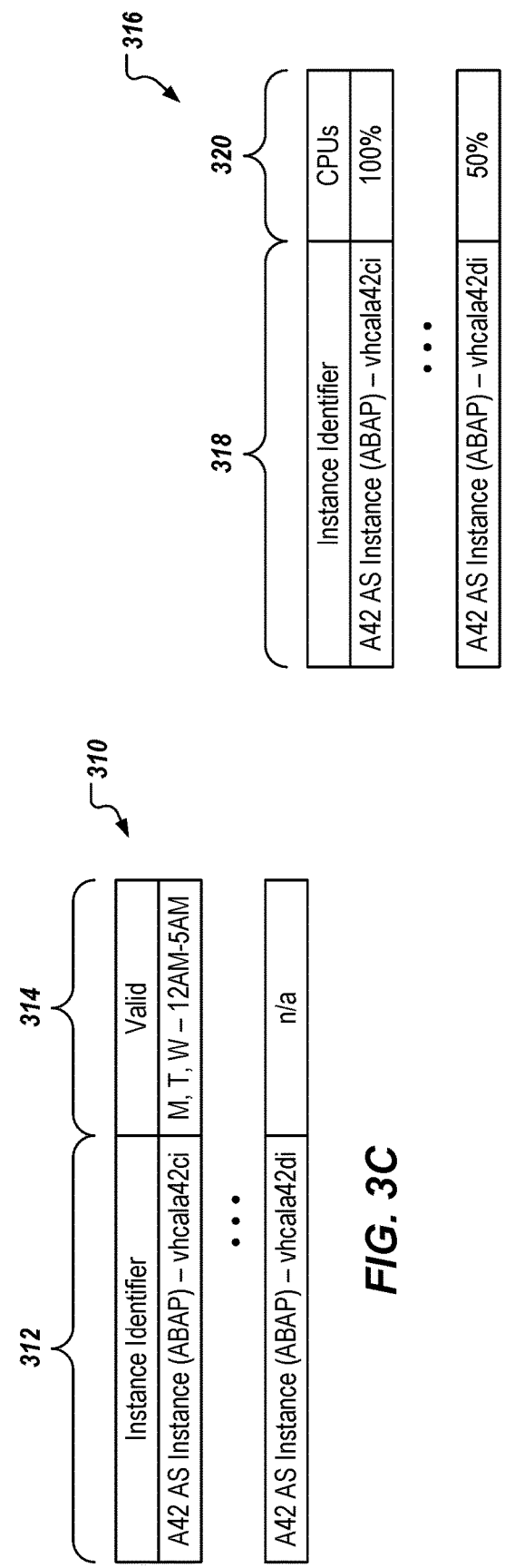

LOGIC SCALING SETS FOR CLOUD-LIKE ELASTICITY OF LEGACY ENTERPRISE APPLICATIONS

BACKGROUND

Enterprises can use enterprise applications to support and execute operations. Enterprise applications can be deployed in on-premise environments, which includes execution of the enterprise applications on enterprise-dedicated hardware, such as a server system within a data center of an enterprise. Enterprise applications are increasingly deployed in cloud-computing environments, which includes execution of the enterprise applications within a data center of a cloud-computing provider (e.g., as part of an infrastructure-as-a-service (IaaS) offering). In some instances, an enterprise may consider migrating an enterprise application deployed within an on-premise environment to a cloud-computing environment. In such a scenario, the enterprise application executing in the on-premise environment can be referred to as a legacy application.

However, applying the operation models from an on-premise deployment of a legacy application to a deployment within a cloud-computing environment can come with significantly increased costs. For example, an operation model can require that the enterprise application is to be available 24 hours per day, 7 days per week. In such an operation model, the operation costs can be significantly higher when deployed within a cloud-computing environment than if deployed on-premise. To leverage cost savings potential, cloud-computing systems continuously adapt their subscribed resources to workload-dependent resource requirements. This can be referred to as elasticity. For example, in timeframes where an enterprise application is rarely used, instances of the enterprise application can be shut down to save costs.

Problems arise in cloud-computing environments that employ elasticity to selectively shut-down instances of enterprise applications. For example, not every instance can be stopped, because instances can be reserved for batch processes and/or other non-user interactive workloads. As another example, instances may be dedicated to on-demand tasks, the timing of which cannot be foreseen. As still another example, an instance can provide a central database that is leveraged by other instances and cannot be readily stopped as the other instances will lose access to the central database.

SUMMARY

Implementations of the present disclosure are directed to elasticity in cloud-computing environments. More particularly, implementations of the present disclosure are directed to logic scaling sets for elasticity in cloud-computing environments.

In some implementations, actions include determining, by an instance manager and from a pattern associated with a system executing within a landscape, that a status of the system is to change to scaled-in, the pattern being absent any reference to instances of systems executed within landscapes, in response, identifying, by the instance manager and from a logic scaling set that is associated with the system, one or more instances of the system that are able to be scaled-in, selecting, by the instance manager, at least one instance of the one or more instances, and executing, by the instance manager, scaling of the system based on the at least one instance. Other implementations of this aspect include corresponding systems, apparatus, and computer programs, configured to perform the actions of the methods, encoded on computer storage devices.

These and other implementations can each optionally include one or more of the following features: the logic scaling set is directly associated with one or more of the system and at least one group that the system is included in, and is absent direct association with any pattern including the pattern; the logic scaling set defines validity data associated with the at least one instance, the validity data including one or more time periods, during which the at least one instance is scalable; the pattern defines a scaling factor and the at least one instance is selected for scaling based on the scaling factor; for each of the one or more instances, the logic scaling pattern specifies an extent to which a respective instance can be scaled; the pattern is generated based on an operation model independent of a configuration of the system, and the logic scaling set is generated based on the configuration of the system independent of the operation model; and executing scaling of the at least one instance includes one of stopping execution of the at least one instance and reducing a number of resources provisioned within the at least one instance.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3D depict example logic scaling sets in accordance with implementations of the present disclosure.

DETAILED DESCRIPTION

Figure 1:
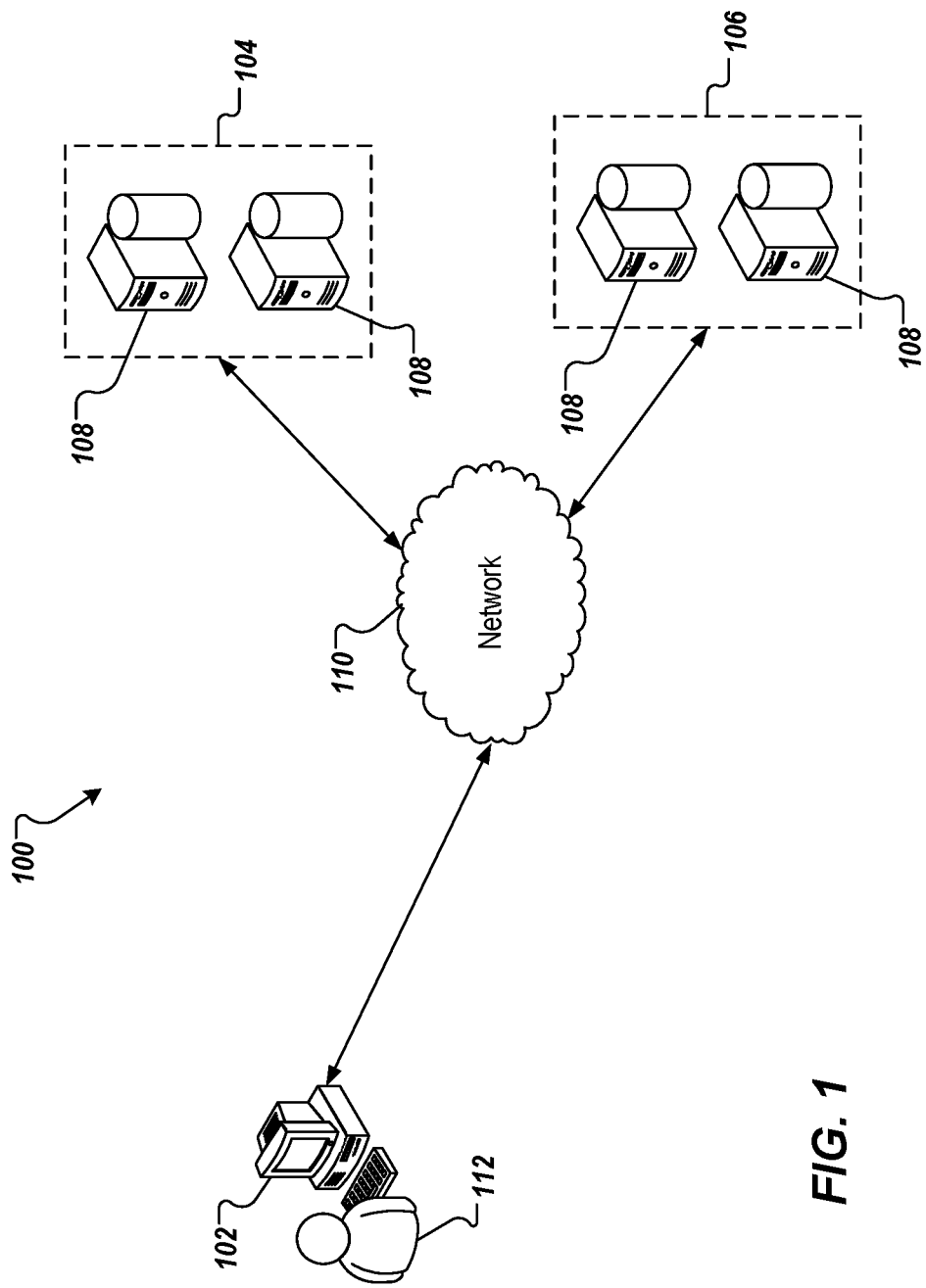
FIG. 1 depicts an example architecture that can be used to execute implementations of the present disclosure.

Implementations of the present disclosure are directed to elasticity in cloud-computing environments. More particularly, implementations of the present disclosure are directed to logic scaling sets for elasticity in cloud-computing environments. Implementations can include actions of determining, by an instance manager and from a pattern associated with a system executing within a landscape, that a status of the system is to change to scaled-in, the pattern being absent any reference to instances of systems executed within landscapes, in response, identifying, by the instance manager and from a logic scaling set that is associated with the system, one or more instances of the system that are able to be scaled-in, selecting, by the instance manager, at least one instance of the one or more instances, and executing, by the instance manager, scaling of the system based on the at least one instance.

Implementations of the present disclosure are described in further detail herein with reference to an example enterprise system provided as a landscape management system. An example landscape management system includes SAP Landscape Management (LaMa) provided by SAP SE of Walldorf, Germany. It is contemplated, however, that implementations of the present disclosure can be realized with any appropriate enterprise application.

To provide further context for implementations of the present disclosure, enterprises can use enterprise applications to support and execute operations. Enterprise applications can be deployed in on-premise environments, which includes execution of the enterprise applications on enterprise-dedicated hardware, such as a server system within a data center of an enterprise. More recently, enterprise applications are frequently deployed in cloud-computing environments, which includes execution of the enterprise applications within a data center of a cloud-computing provider (e.g., as part of an infrastructure-as-a-service (IaaS) offering). In some instances, an enterprise may consider migrating an enterprise application deployed within an on-premise environment to a cloud-computing environment. In such a scenario, the enterprise application executing in the on-premise environment can be referred to as a legacy application.

However, applying the operation models from an on-premise deployment to a deployment within a cloud-computing environment can come with significantly increased costs. For example, an operation model can require that an enterprise application is to be available 24 hours per day, 7 days per week. In such an operation model, the operation costs can be significantly higher when deployed within a cloud-computing environment than if deployed on-premise. To leverage cost savings potential, cloud-computing systems continuously adapt their subscribed resources to workload-dependent resource requirements. This can be referred to as elasticity. For example, in timeframes where an enterprise application is rarely used, instances of the enterprise application can be shut down to save costs.

Problems arise in cloud-computing environments that employ elasticity to selectively scale-in (e.g., shut down) instances of enterprise applications. For example, not every instance can be stopped, because instances can be reserved for batch processes and/or other non-user interactive workloads. As another example, instances may be dedicated to on-demand tasks the timing of which cannot be foreseen. As still another example, an instance can provide a central database that is leveraged by other instances and cannot be readily stopped as the other instances will lose access to the central database.

By way of non-limiting example, SAP LaMa, introduced above, supports enterprises in migrating on-premise deployments of enterprise applications to cloud-computing environments (e.g., IaaS offerings) in an effort to reduce resource costs borne by the enterprise. As part of this, services can be provided to scale instances of the enterprise application based on dynamic workloads. This scaling is typically achieved by starting instances (scale-out) and stopping instances (scale-in), such as application server instances. In a traditional approach, the enterprise can manually define patterns that scale an enterprise application based on a user-defined schedule. For example, a user (e.g., an administrator employed by the enterprise) defines a certain scaling factor (e.g., percentage) of the enterprise application for defined timeframes. In another traditional approach, scaling can be done automatically based on observed workloads and service level agreement (SLA) monitoring. For example, a scaling factor is automatically selected and applied based on a current workload to minimize a number of instances, while still achieving availability defined within a SLA. In this case, the pattern is based on an algorithm and not a pre-defined schedule.

However, a typical enterprise application can be assumed to have at least one database (DB) instance and several application server (AS) instances. For example, in scaling, instances can be increased (scaled-out) to handle increased workloads, or decreased (scaled-in) to handle decreased workloads. However, not every instance can be readily stopped, because some instances are reserved for certain functionality (e.g., batch processes, non-user interactive workloads, dedicated on demand tasks that are unpredictable, a central DB, a centrally used service for other instances).

To address this, traditional approaches can provide hard references within a pattern to specific instances that can be selectively stopped, the pattern defining time periods for scaling-in/-out and the instances that are to be scaled-in/-out. However, this requires detailed knowledge of the configuration of a system (i.e., knowing which instances can or cannot be scaled-in) in hand with detailed knowledge of an operation model (e.g., knowing days and time periods for systems to be scaled-in or scaled-out). That is, knowledge coupling is required between system configurations and operation models.

Such a requirement for knowledge coupling in traditional approaches comes along with several drawbacks. For example, if a user changes the pattern assigned to an enterprise application, the user must again define the instances that can be selectively stopped. As another example, if the layout of the enterprise application changes (e.g., static instances are added) the assignment as to whether an instance can be stopped may no longer be valid. As another example, a pattern cannot be readily reused, and assignment to an enterprise application requires manual intervention each time. As till another example, a pattern cannot define a scaling factor in terms of a value (e.g., percentage) and instead needs to refer to multiple, specific instances. As a further example, a pattern cannot be assigned to a group of systems directly, since each system needs manual declarations of instances to be stoppable.

As another example, knowledge coupling can frustrate automated scaling approaches, as there is no knowledge about the type of instances (e.g., stoppable, not stoppable) in context of scaling. Even, if knowledge about the type of instances could be retrieved by some characteristics in an automated way, there might still be the need for the user to check and to override it, making an automated approach actually semi-automated. This might be needed, because a 100% perfect automated classification of instances might not be possible. In some scenarios, a user seeks to define an upper limit and a lower limit of instances available for scaling activities, while an autoscaling algorithm may work with values between 0-100% to be decoupled from the concrete systems setup and the defined scaling limits.

In view of this, and as described in further detail herein, implementations of the present disclosure provide logic scaling sets for elasticity in cloud-computing environments. The logic scaling sets enable decoupling of knowledge in scaling of systems in cloud-computing environments. In some examples, the logic scaling sets enhance the actual knowledge about a landscape and the enterprise applications executing within the landscape with additional information about scalability. In some implementations, the logic scaling sets can be retrieved and modified by independent components to collect knowledge about types of instances (e.g., stoppable, not stoppable) of an enterprise application. That is, the logic scaling set can be changed without affecting the pattern. In some examples, a pattern can be defined independently of knowledge of system configurations (e.g., which instances can be scaled-in). That is, a pattern can be absent identification of specific instances that can be scaled. Consequently, the pattern can be changed without affecting the logic scaling set.

Further, patterns can be applied on a set of scalable instances of an enterprise application, instead applying the pattern across all instances. The actual assignments may refer to the enterprise application, but can be implicitly assigned to the related logic scaling set. As described herein, implementations of the present disclosure enable enforcement of only stopping instances that do not have a negative impact on overall system functionality (e.g., executing batch processing, central communication services, database etc.).

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store.

In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host one or more managed systems (e.g., enterprise applications in a landscape) that support operations of one or more enterprises. Further, the server system 106 can host a landscape management system (e.g., SAP Landscape Management (LaMa)) that can be used to manage enterprise applications in a landscape. In some implementations, and as described in further detail herein, elasticity of instances of an enterprise application can be managed based on one or more logical scaling sets.

In some implementations, scaling functionality of the present disclosure is separated into multiple parts. In some examples, a first part determines how the new landscape should look and a second part transfers the current system into the new state. For example, a hard-defined pattern may require running the enterprise application/system with one database (1DB) instance and two application servers (ASs), while the current state includes 1DB instance and four application servers. Therefore, in the second part, the management system derives the needed operations to achieve the target state and will trigger application servers stop operations. To know which of these instances can be stopped and what applicable patterns for a given enterprise application/system are, the scaling sets of the present disclosure are implemented, as described herein. These scaling sets describe which instances can be stopped/started in order to achieve scalability.

Figure 2:
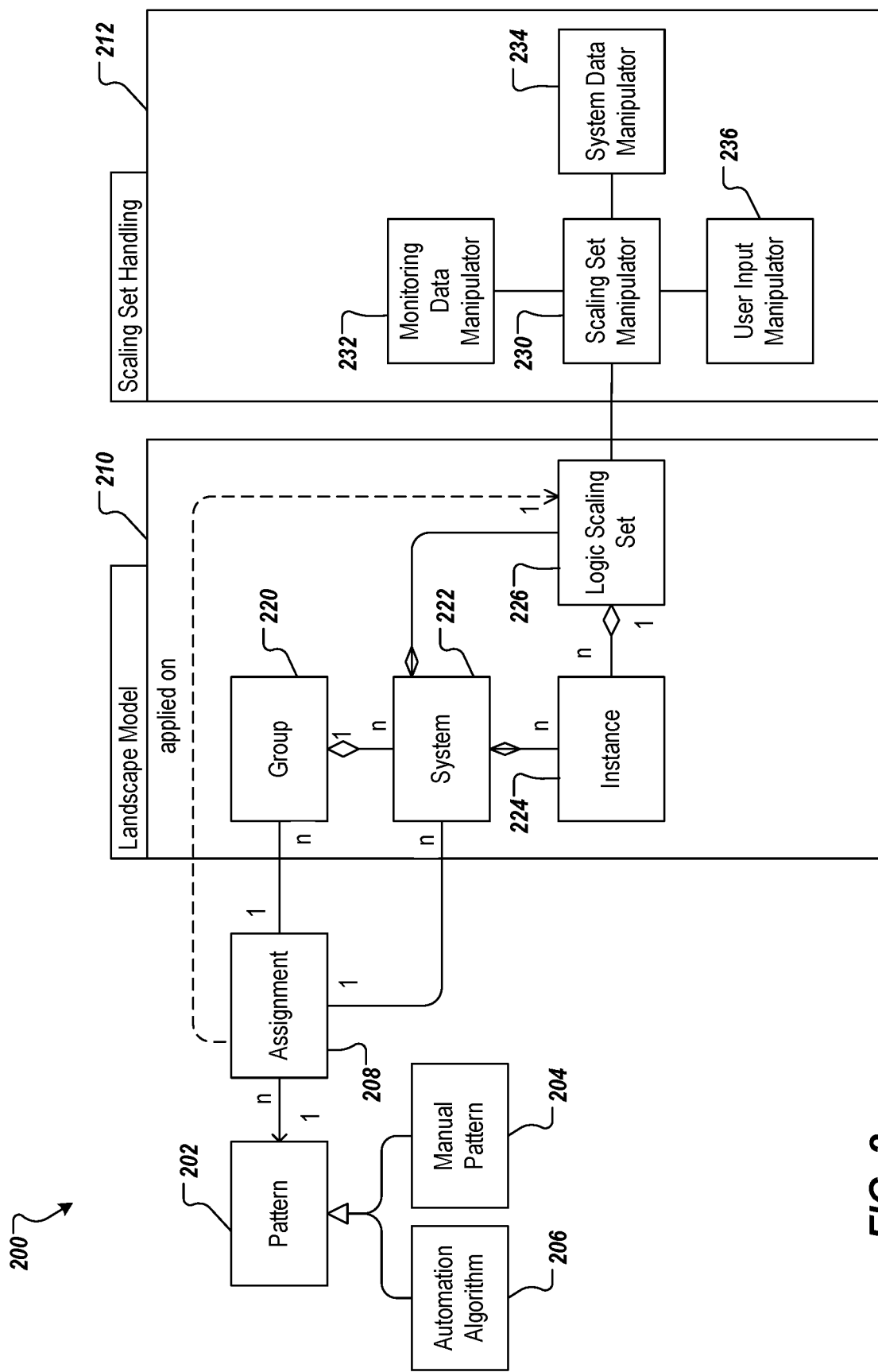
FIG. 2 depicts an example conceptual architecture for use of logic scaling sets in accordance with implementations of the present disclosure.

FIG. 2 depicts an example conceptual architecture 200 for use of logic scaling sets in accordance with implementations of the present disclosure. In the depicted example, the conceptual architecture 200 includes a pattern 202, a manual pattern 204, an automation algorithm 206, an assignment 208, a landscape model 210, and logic scaling set handling 212. The landscape model 210 includes a group 220, a system 222 (e.g., enterprise application executed within a landscape modeled by the landscape model 210), an instance 224, and a logic scaling set 226. The logic scaling set handling 212 includes a logic scaling set manipulator 230, a monitoring data manipulator 232, a system data manipulator 234, and a user input manipulator 236.

In some implementations, as used herein, managed system or enterprise system can each refer to a set of software components and processes, which provide (together) a certain functionality. In some contexts, these components and processes are structured as instances (e.g., DB instance(s), application server instance(s), and central instance(s)/central service(s)). A system in the context of the present disclosure can include at least the DB instance and the central instances, which combines central services and one application server instance. Application servers provide the actual business logic, central services the shared technical functionality like enqueue services and the database storage. These instances can be installed together on one operating system/host or distributed on different individual hosts. In the context of the present disclosure, starting and stopping of instances/scaling of systems also implies the start/stop of the virtual machine (VM) the respective instance in running on.

To leverage savings and to enable scaling, this can also imply installation of at least the application server instances on separate hosts/VMs.

In some implementations, the pattern 202 is provided as a computer-readable file that contains information on when a system (e.g., the system 222) or a group of systems (e.g., the group 220) is to be scaled within the landscape. The pattern 202 is provided as either the manual pattern 204 or an automatically generated pattern provided by the automation algorithm 206. In either case, the logic scaling sets of the present disclosure, as described in further detail herein, enable the pattern 202 to be provided without knowledge about the configuration of the system (or group), to which the pattern 202 is to be applied. The pattern 202, however, is absent identification of specific instances (or resources of instances) to be used for scaling. In this manner, the pattern 202 is provided without requiring knowledge of the configuration of the system 222 or group 220, to which the pattern 202 is assigned.

In some examples, the pattern 202 is provided as a computer-readable file that contains data defining a set of fixed timeframes and, for each timeframe, an indication of whether the system (or group) is running, scaled-in, or stopped. That is, the pattern 202 can define a status of the system 222 (or group 220) for each timeframe, the status being one of running, scaled-in, or stopped. In some examples, running indicates that all instances of a system are executing. In some examples, scaled-in indicates that one or more instances of the system are stopped and/or resources within one or more resources are stopped. In some examples, stopped indicates that the entire system is stopped (e.g., all instances are stopped). By way of non-limiting example, for a particular system (or group), the pattern 202 can define, for each day of the week, periods of time during, which the system (or group) is either running, scaled-in, or stopped.

In some examples, for timeframes indicating scaled-in, the pattern 202 can include a scaling factor. Example scaling factors can include, without limitation, a percentage (e.g., a percentage of instances and/or resources within instances that can be stopped), and a fixed value (e.g., a percentage of instances and/or resources within instances that can be stopped). As described in further detail herein, a number of instances identified in the logic scaling set 226 can be selected based on the scaling factor to achieve the scale-in.

In accordance with implementations of the present disclosure, the pattern 202 is absent identification of specific instances (or resources of instances) that can be scaled-in during timeframes indicating scale-in. In this manner, knowledge on configuration of the system is decoupled from knowledge on the operation model of the system, the operation model represented by the pattern 202. Instead, and as described in further detail herein, the logic scaling set 226 embodies knowledge on the configuration of the system, to be applied for scaling. In this manner, the pattern 202 can be modified independently of the logic scaling set 226, and/or the logic scaling set 226 can be modified independently of the pattern 202. For example, the pattern 202 may be modified in response to a change in operation model (e.g., increased workload during particular timeframes), which does not affect configuration of the system. As another example, the logic scaling set may be modified in response to a change in the configuration of the system (e.g., more instances are added to the system), which does not affect the operation model.

In some examples, the automation algorithm 206 is a computer-executable program that automatically generates the pattern 202. For example, the automation algorithm 206 can derive a number of instances during runtime of the enterprise application based on one or more parameters. Example parameters can include, without limitation, a workload and a required workload (e.g., the required workload corresponding to a SLA that is to be met). For example, a workload that is currently being processed by a system executing the enterprise application within the landscape can be determined and compared to the required workload. For each timeframe, if the workload exceeds a threshold workload, the pattern 202 can be generated to increase (scale-out) a number of instances. If the workload does not exceed the threshold workload, the pattern 202 can be generated to decrease (scale-in) the number of instances. In some examples, the threshold workload is a percentage of the required workload.

In some implementations, the assignment 208 associates the pattern 202 to either a group 220 or a system 222. For example, the assignment 208 can be provided as a data set that identifies a pattern 202 using a unique identifier that uniquely identifies the pattern 202 among a set of patterns, and that identifies one or more systems 222 and/or one or more groups 220 by respective unique identifiers that uniquely identify each system 222 or group 220.

Although a single group 220 is depicted in FIG. 2, one or more groups 220 can be defined within the landscape. Each group 220 is provided as computer-readable data that defines a set of systems (including one or more systems 222) that share some common properties (e.g., organization properties). For example, a group 222 can characterize workload behaviour that is the same for each system 222 in the set of systems. Accordingly, if the pattern 202 is associated with a group 220, the pattern 202 is applied to all of the systems 222 included in the group 220. Each group 220 can be of a different type of group. Example types of groups include, without limitation, a development group, a test group, a quality group, and a sandbox group. As noted above, each group 220 can include one or more systems 222.

Although a single system 222 is depicted in FIG. 2, one or more systems 222 can be executed within the landscape. In some examples, each system 222 provides one or more services to enterprises through execution of at least one enterprise application. Example services provided by a system can include, without limitation, enterprise resource planning (ERP) services, and customer relationship management (CRM) services. It is contemplated that implementations of the present disclosure can be realized with any appropriate enterprise application.

As described herein, a system 222 can include one or more instances 224 of an enterprise application. More particularly, to be able to process potentially high workloads, a workload can be distributed across multiple instances 224. In some examples, the instances 224 can have different characteristics (e.g., functional characteristics, non-functional characteristics). For example, a first instance can provide a central database (e.g., central DB instance), a second instance can provide batch processing, a third instance can perform central communication between instances, and one or more fourth instances can execute functionality in response to user requests.

In accordance with implementations of the present disclosure, the logic scaling set 226 defines the instances 224 (and/or resources of instances) of a system 222 that can be scaled-in to achieve scalability without adversely impacting operation of the system 222, as a whole. That is, the logic scaling set 226 can include data identifying one or more instances 224 of a system 222. By inclusion on the logic scaling set 226 an instance 224 is identified as an instance that can be scaled-in (e.g., stopped) or resources of the instance 224 can be reduced for achieving elasticity based on the pattern 202 (i.e., during timeframes indicating scaled-in). In some implementations, the assignment 208 is still assigned to a system 222 or a group 220. However, when the pattern 202 is applied and analysed to perform scaling (e.g., scaling-out, scaling-in), the scaling is only applied to instances within the logic scaling set 226.

In some implementations, the scaling set manipulator 230 is used to create logic scaling sets 226 for respective systems 222. For example, and as discussed in further detail herein, the scaling set manipulator 230 can receive input from one or more input sources, the input indicating one or more instances 224 to be added or removed from the logic scaling set 226. For example, the user input manipulator 236 can expose a user interface (UI) that enables a user to provide input to add or remove instances 224 from a logic scaling set 226. As another example, the system data manipulator 234 can provide input based on system data, a system configuration, instance data, and/or an instance configuration.

In some implementations, the system data manipulator 232 reads configuration information from, for example, application- or instance-specific configuration files, database entries or provided REST/WEBAPI resources to determine whether an instance plays a central role and cannot be used for scaling or, for example, serves for batch processing and cannot be used or, for example, is an application server instance that can be used for scaling. In some examples, based on monitoring information, hard-coded knowledge, and/or statistical methods/machine learning (ML), the system data manipulator 232 can derive whether an instance shall be part of a scaling set. For example, a central service providing instance shall not be part of the scaling set and based on the network traffic patterns it can be derived, which instance is a central service or an application server or a database. Another example could be suddenly appearing high resource consumptions after a single call or without any external interaction at all. Usually, such a pattern is present if batch processes are executed. If this occurs on one instance only, without any other load, it can be determined that this instance is used for batch processing only any maybe no other instances. Therefore, stopping this instance in a scale in phase could lead to non-executed batch processes, which is to be avoided.

As still another example, the monitoring data manipulator 232 can process monitoring data that represents execution of instances 224 within the landscape, the monitoring data indicating functionality that an instance 224 performs. For example, the monitoring data can indicate that an instance 224 always performs certain functionality, and in response, the monitoring data manipulator 232 can provide input to the scaling set manipulator 230 to address the instance 224. For example, the monitoring data can indicate that a first instance always executes system functionality in response to user requests. Consequently, input can be provided to the scaling set manipulator 230 to identify the first instance as being scalable (e.g., started/stopped). As another example, the monitoring data can indicate that a second instance always executes DB functionality for other instances. Consequently, input can be provided to the scaling set manipulator 230 to identify the second instance as not being scalable. In some examples, monitoring data is periodically processed to provide the input.

In some examples, input provided from the monitoring data manipulator 232 can override input provided from another source. For example, a user can identify an instance as being scalable through the UI exposed by the user input manipulator 236. After the underlying system has operated for a period of time (e.g., day, week, month), monitoring data can be processed by the monitoring data manipulator 232 and it can be determined that the instance consistently provides functionality, indicating that the instance should not be used for scaling (e.g., performs central DB functionality, batch processing, or central communications). In response, the monitoring data manipulator 232 can provide input to the scaling set manipulator 230 to identify the instance as not being scalable within a logic scaling set 226.

FIGS. 3A-3D depict example logic scaling sets in accordance with implementations of the present disclosure.

With particular reference to FIG. 3A, an example logic scaling set 300 includes a set of instances 302. Although a set of instances of a logic scaling set can include one or more instances, the set of instances 302 of FIG. 3A includes multiple instances. Each instance is identified by a unique identifier (e.g., vhcala42ci) that uniquely identifies an instance relative to other instances. In some implementations, if the system, to which the logic scaling set 300 is applied is to be scaled-in, one or more of the instances in the set of instances 302 can be stopped to achieve the scale-in. For example, a pattern can indicate that the system is to be scaled-in on Monday from 12 AM-5 AM. Consequently, on Monday, at 12 AM (or shortly before), the system can be scaled based on the logic scaling set 300.

With particular reference to FIG. 3B, an example logic scaling set 304 includes a set of instances 306 and validity data 308. Although a set of instances of a logic scaling set can include one or more instances, the set of instances 306 of FIG. 3B includes multiple instances. Each instance is identified by a unique identifier (e.g., vhcala42ci) that uniquely identifies an instance relative to other instances. The validity data 308 indicates one or more timeframes, during which the logic scaling set 306 is valid. That is, the validity data 308 indicates one or more timeframes, during which one or more instances of the logic scaling set 306 can be used for scaling. In some implementations, if the system, to which the logic scaling set 304 is applied is to be scaled-in, one or more of the instances in the set of instances 306 can be stopped to achieve the scale-in, if the timeframe is represented in the validity data 308. For example, a pattern can indicate that the system is to be scaled-in on Monday from 12 AM-5 AM. Consequently, it can be determined that the timeframe is represented in the validity data 308, and, as a result, on Monday, at 12 AM (or shortly before), the system can be scaled based on the logic scaling set 304. As another example, a pattern can indicate that the system is to be scaled-in on Monday from 7 AM-12 PM. Consequently, it can be determined that the timeframe is not represented in the validity data 308, and, as a result, the system is not scaled based on the logic scaling set 304. In some examples, the system can instead be scaled based on another logic scaling set, not depicted in FIG. 3B.

With particular reference to FIG. 3C, an example logic scaling set 310 includes a set of instances 312 and a set of validity data 314, the set of validity data 314 including validity data for each instance in the set of instances 312. Although a set of instances of a logic scaling set can include one or more instances, the set of instances 312 of FIG. 3C includes multiple instances. Each instance is identified by a unique identifier (e.g., vhcala42ci) that uniquely identifies an instance relative to other instances. The set of validity data 314 indicates, for each instance, one or more timeframes, during which the respective instance is valid for scaling-in. In some implementations, if the system, to which the logic scaling set 310 is applied is to be scaled-in, one or more of the instances in the set of instances 312 can be stopped to achieve the scale-in, if the timeframe is represented in the validity data for the respective instance in the set of validity data 314. For example, a pattern can indicate that the system is to be scaled-in on Monday from 12 AM-5 AM. Consequently, it can be determined that the timeframe is represented in the validity data associated with the first instance in the set of instances 312. It can also be determined that there is not validity data applicable for the last instance in the set of instances. As a result, on Monday, at 12 AM (or shortly before), the system can be scaled based on the first instance and/or the last instance in the set of instances 312. As another example, a pattern can indicate that the system is to be scaled-in on Monday from 7 AM-12 PM. Consequently, it can be determined that the timeframe is not represented in the validity data associated with the first instance in the set of instances 312. It can also be determined that there is not validity data applicable for the last instance in the set of instances. As a result, on Monday, at 7 AM (or shortly before), the system can be scaled based on the last instance in the set of instances 312, but not the first instance.

With particular reference to FIG. 3D, an example logic scaling set 316 includes a set of instances 318 and a set of resource values 320, the set of resource values 320 indicating a percentage of a resource (e.g., CPUs) that can be used for scale-in for each instance in the set of instances 318. Although a set of instances of a logic scaling set can include one or more instances, the set of instances 312 of FIG. 3D includes multiple instances. Each instance is identified by a unique identifier (e.g., vhcala42ci) that uniquely identifies an instance relative to other instances. In some implementations, if the system, to which the logic scaling set 316 is applied is to be scaled-in, at least a portion of one or more of the instances in the set of instances 318 can be stopped to achieve the scale-in. In the depicted example, up to 100% of the CPUs of the first instance can be stopped (e.g., the first instance can be stopped in its entirety), and up to 50% of the CPUs of the last instance can be stopped (e.g., a portion of the last instance can be stopped, but not the last instance in its entirety) to achieve the scale-in.

Although FIGS. 3A-3D depict example logic scaling sets, implementations of the present disclosure can be realized using any appropriate scaling set. For example, a logic scaling set can include any appropriate combination of a set of instances, validity data, a set of validity data, and a set of resources, as each is described herein. Further, although validity data is discussed, it is contemplated that a logic scaling set can include invalidity data, defining time periods, during which one or more instances cannot be scaled-in.

In some implementations, a logic scaling set can be automatically generated for a system. For example, monitoring data can be provided that represents execution of the system over a period of time (e.g., days, weeks, months). The monitoring data can represent a set of instances of the system and, for each instance, indicate activity of the instance. The monitoring data can be processed to identify each instance as a type of instance based on the activity data. For example, the monitoring data can be processed using one or more models across timeframes and, for each timeframe, assign a respective status (e.g., running, scaled-in, stopped). Example models can include, without limitation, statistical models and/or machine learning (ML) models that have been trained to predict operation of the system over time. In some example, the monitoring data can be processed to determine, for each timeframe having a status of scaled-in, a scaling factor that is to be applied.

Figure 4:
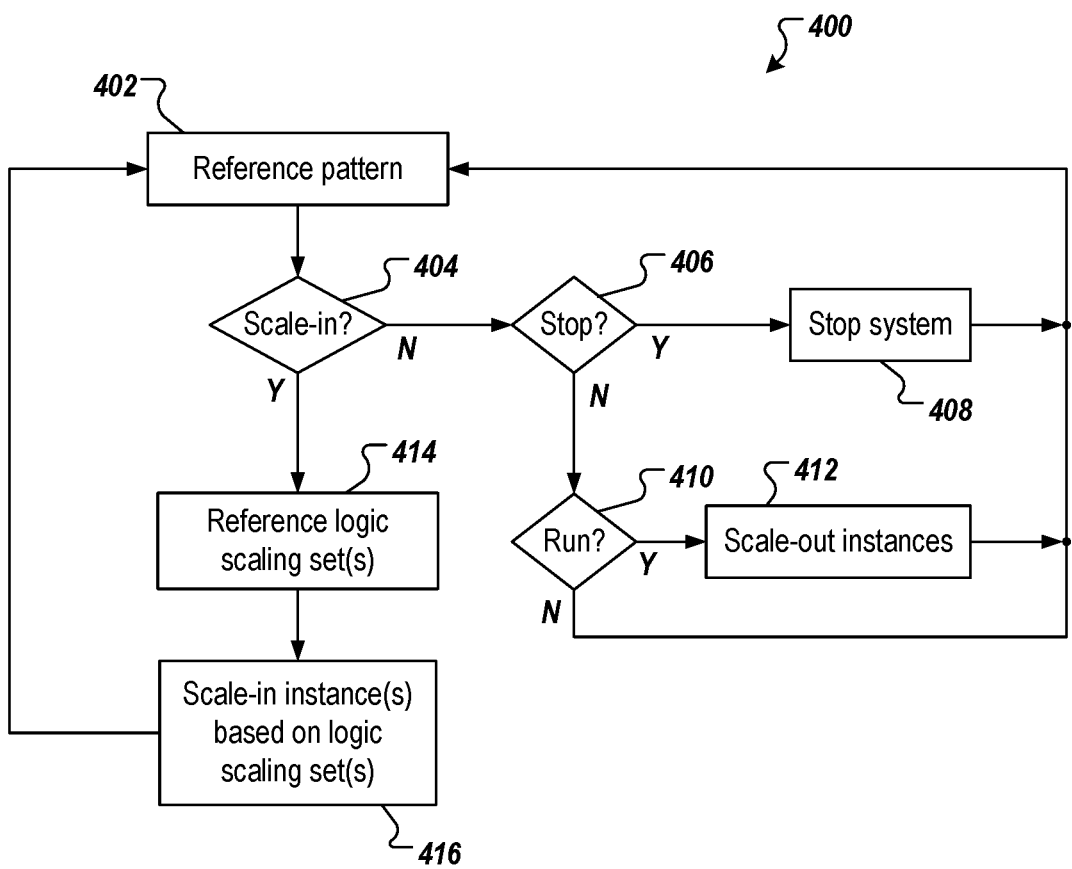
FIG. 4 depicts an example processes that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A pattern is referenced (402). For example, an instance manager provided as a component of a landscape management system can reference a pattern that is assigned to a system executed within a landscape. In some examples, and as described herein, the pattern is provided as a computer-readable file storing data that defines a set of timeframes during a period (e.g., day) and, for each timeframe, defines a status that the system is to be operating in. Example statuses include, without limitation, running, scaled-in, stopped. In some examples, running indicates that all instances of the system should be executing. The running status can be defined for peak times, for example, during which workload on the system is heavier. In some examples, scaled-in indicates that one or more instances of the system should be stopped and/or operating with reduced resources (e.g., CPUs). The scaled-in status can be defined for off-peak times, for example, during which workload on the system is lighter (e.g., as compared to peak times). In some examples, stopped indicates that all instances of the system should be stopped (i.e., the system as a whole is stopped).

In some examples, the instance manager determines an actual status of the system and a to-be status of the system. In some examples, the actual status of the system can be determined based on monitoring data (e.g., log data) that indicates the number of instances executing. If all instances of the system are executing, the status of the system is running. If less than all of the instances of the system are executing and/or less than all resources of an instance are being used, the status of the system is scaled-in. If no instances of the system are executing, the status of the system is stopped. In some examples, the to-be status of the system is determined from the pattern.

It is determined whether scale-in is to be performed (404). For example, the actual status and the to-be status can be checked to determine whether scale-in is to be performed. If the actual status is scaled-in and/or the to-be status is stopped or running, it is determined that scale-in is not to be performed (i.e., the system is already scaled-in, or another status besides scaled-in is to be used). If the actual status is not scaled-in and the to-be status is scaled-in, it is determined that scale-in is to be performed.

If scale-in is not to be performed, it is determined whether the system is to be stopped (406). For example, the actual status and the to-be status can be checked to determine whether system stop is to be performed. If the actual status is stopped and/or the to-be status is scaled-in or running, it is determined that system stop is not to be performed (i.e., the system is already stopped, or another status besides stopped is to be used). If the actual status is not stopped and the to-be status is stopped, it is determined that system stop is to be performed. If the system is to be stopped, the system is stopped (408) and the example process 400 loops back. For example, the instance manager executes instructions to stop all instances of the system.

If the system is not to be stopped, it is determined whether the system is to be running (410). For example, the actual status and the to-be status can be checked to determine whether all instances of the system are to be executed. If the actual status is running and/or the to-be status is scaled-in or stopped, it is determined that running is not to be performed (i.e., the system is already running, or another status besides running is to be used). If the actual status is not running and the to-be status is running, it is determined that all instances of the system are to be executed. If the system is to be running, instances of the system are scaled-out (412) and the example process 400 loops back. For example, if the actual status is stopped, all instances of the system are scaled-out. As another example, if the actual status is scaled-in, scaled-in instances of the system are scaled-out. If the system is not to be running, the example process 400 loops back.

If scale-in is to be performed, one or more logic scaling sets are referenced (414). For example, and as described herein, a logic scaling set is associated with the system (e.g., the system includes a reference to the logic scaling system). In response to the pattern indicating that the system is to be scaled-in, and the actual status not being scaled-in, the logic scaling set(s) is referenced to determined instances that are to be stopped and/or resources of instances that are to be reduced to achieve the scaling. One or more instances are scaled-in based on the logic scaling set(s) (416), and the example process 400 loops back. For example, the instance manager executes instructions to stop one or more instances and/or reduce resources of one or more instances, as defined in the logic scaling set(s).

Implementations of the present disclosure provide the following example advantages. Implementations of the present disclosure decouple knowledge on an operation model of a system and knowledge on configuration of the system. In this manner, a pattern that is to be applied to a system for selective scale-in/-out of instances can be defined independently of the particular instances. That is, the pattern is agnostic to instances of the system and, thus, absent identification of specific instances of the system that are to be used for scale-in/-out. Further, each logic scaling set of the present disclosure can be implemented by any pattern, because the patterns are agnostic to the instances of the system. Implementations of the present disclosure enable a reduction in use resources (technical resources embodied in instances (e.g., CPUs, memory) without losing functionality of the system as a whole. In this manner, technical improvements are achieved, as resources are conserved.

Figure 5:
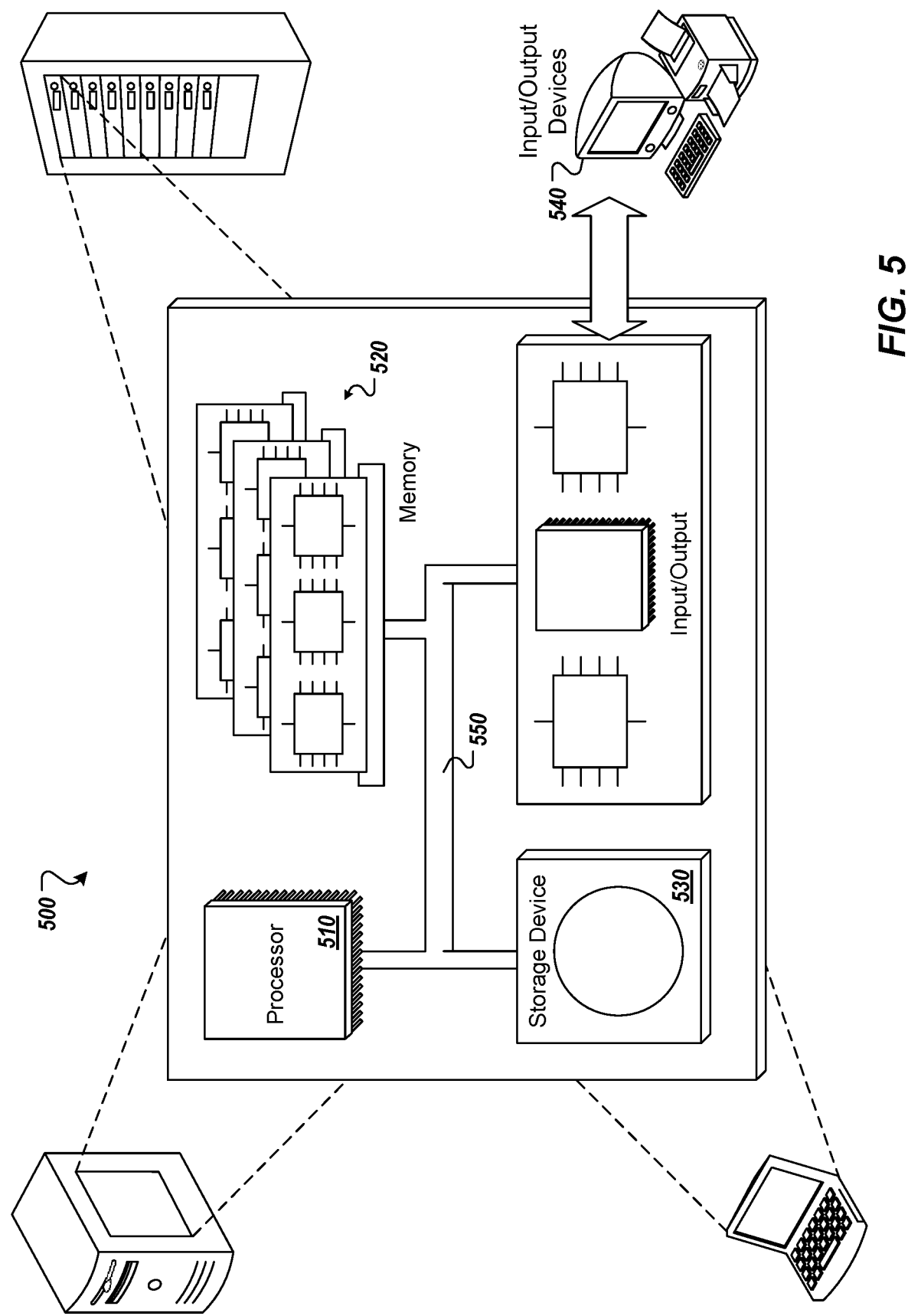
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selective scaling of a system based on one or more instances executed within a landscape, the method being executed by one or more processors and comprising:
   determining, by an instance manager and from a pattern associated with the system executing within the landscape, that a status of the system is to change to scaled-in, the pattern being absent any reference to instances of systems executed within landscapes, the pattern including a set of statuses, each status being associated with a fixed timeframe, the set of statuses comprising running, scaled-in, and stopped, running indicating that all instances are executing, scaled-in indicating that fewer than all instances are executing, and stopped indicating that all instances are stopped;
   in response, identifying, by the instance manager and from a logic scaling set that is associated with the system, one or more instances of the system that are able to be scaled-in;
   selecting, by the instance manager, at least one instance of the one or more instances; and
   executing, by the instance manager, scaling of the system based on the at least one instance.

2. The method of claim 1, wherein the logic scaling set is directly associated with one or more of the system and at least one group that the system is included in, and is absent direct association with any pattern including the pattern.

3. The method of claim 1, wherein the logic scaling set defines validity data associated with the at least one instance, the validity data comprising one or more time periods, during which the at least one instance is scalable.

4. The method of claim 1, wherein the pattern defines a scaling factor and the at least one instance is selected for scaling based on the scaling factor.

5. The method of claim 1, wherein, for each of the one or more instances, the logic scaling pattern specifies an extent to which a respective instance can be scaled.

6. The method of claim 1, wherein the pattern is generated based on an operation model independent of a configuration of the system, and the logic scaling set is generated based on the configuration of the system independent of the operation model.

7. The method of claim 1, wherein executing scaling of the at least one instance comprises one of stopping execution of the at least one instance and reducing a number of resources provisioned within the at least one instance.

8. A non-transitory computer-readable storage medium coupled to one or more processors and having instructions stored thereon which, when executed by the one or more processors, cause the one or more processors to perform operations for selective scaling of instances of a system executed within a landscape, the operations comprising:
   determining, by an instance manager and from a pattern associated with the system executing within the landscape, that a status of the system is to change to scaled-in, the pattern being absent any reference to instances of systems executed within landscapes, the pattern including a set of statuses, each status being associated with a fixed timeframe, the set of statuses comprising running, scaled-in, and stopped, running indicating that all instances are executing, scaled-in indicating that fewer than all instances are executing, and stopped indicating that all instances are stopped;
   in response, identifying, by the instance manager and from a logic scaling set that is associated with the system, one or more instances of the system that are able to be scaled-in;
   selecting, by the instance manager, at least one instance of the one or more instances; and
   executing, by the instance manager, scaling of the system based on the at least one instance.

9. The computer-readable storage medium of claim 8, wherein the logic scaling set is directly associated with one or more of the system and at least one group that the system is included in, and is absent direct association with any pattern including the pattern.

10. The computer-readable storage medium of claim 8, wherein the logic scaling set defines validity data associated with the at least one instance, the validity data comprising one or more time periods, during which the at least one instance is scalable.

11. The computer-readable storage medium of claim 8, wherein the pattern defines a scaling factor and the at least one instance is selected for scaling based on the scaling factor.

12. The computer-readable storage medium of claim 8, wherein, for each of the one or more instances, the logic scaling pattern specifies an extent to which a respective instance can be scaled.

13. The computer-readable storage medium of claim 8, wherein the pattern is generated based on an operation model independent of a configuration of the system, and the logic scaling set is generated based on the configuration of the system independent of the operation model.

14. The computer-readable storage medium of claim 8, wherein executing scaling of the at least one instance comprises one of stopping execution of the at least one instance and reducing a number of resources provisioned within the at least one instance.

15. A system, comprising:
   a computing device; and
   a computer-readable storage device coupled to the computing device and having instructions stored thereon which, when executed by the computing device, cause the computing device to perform operations for anomaly detection for selective scaling of instances of a system executed within a landscape, the operations comprising:
      determining, by an instance manager and from a pattern associated with the system executing within the landscape, that a status of the system is to change to scaled-in, the pattern being absent any reference to instances of systems executed within landscapes, the pattern including a set of statuses, each status being associated with a fixed timeframe, the set of statuses comprising running, scaled-in, and stopped, running indicating that all instances are executing, scaled-in indicating that fewer than all instances are executing, and stopped indicating that all instances are stopped;

in response, identifying, by the instance manager and from a logic scaling set that is associated with the system, one or more instances of the system that are able to be scaled-in;

selecting, by the instance manager, at least one instance of the one or more instances; and executing, by the instance manager, scaling of the system based on the at least one instance.

16. The system of claim 15, wherein the logic scaling set is directly associated with one or more of the system and at least one group that the system is included in, and is absent direct association with any pattern including the pattern.

17. The system of claim 15, wherein the logic scaling set defines validity data associated with the at least one instance, the validity data comprising one or more time periods, during which the at least one instance is scalable.

18. The system of claim 15, wherein the pattern defines a scaling factor and the at least one instance is selected for scaling based on the scaling factor.

19. The system of claim 15, wherein, for each of the one or more instances, the logic scaling pattern specifies an extent to which a respective instance can be scaled.

20. The system of claim 15, wherein the pattern is generated based on an operation model independent of a configuration of the system, and the logic scaling set is generated based on the configuration of the system independent of the operation model.

* * * * *